United States Patent [19]

Bainbridge

[11] Patent Number: 4,726,723
[45] Date of Patent: Feb. 23, 1988

[54] MULTI-PART LOCKNUT CONSTRUCTION

[75] Inventor: Gary R. Bainbridge, North Tonawanda, N.Y.

[73] Assignee: McGard, Inc., Buffalo, N.Y.

[21] Appl. No.: 754,744

[22] Filed: Jul. 15, 1985

[51] Int. Cl.4 ............................................. F16B 37/08
[52] U.S. Cl. ..................... 411/432; 411/910; 411/919
[58] Field of Search ............... 411/910, 427, 429, 432, 411/410, 430, 431, 919; 70/229, 231, 232

[56] References Cited

U.S. PATENT DOCUMENTS

| 2,823,725 | 2/1958 | Trinca | 411/919 |
| 3,241,408 | 3/1966 | McCauley | 411/910 |
| 3,342,096 | 9/1967 | Bobrowski | 411/432 |
| 3,978,698 | 9/1976 | Ono | 70/231 |
| 4,081,979 | 4/1978 | Dawson | 411/910 |
| 4,324,516 | 4/1982 | Sain et al. | 411/910 |
| 4,406,140 | 9/1983 | Wolter | 70/231 |
| 4,521,146 | 6/1985 | Wharton | 411/910 |
| 4,574,602 | 3/1986 | Furuse | 411/429 |

FOREIGN PATENT DOCUMENTS 858088  1/1961  United Kingdom ................ 411/410

Primary Examiner—Neill Wilson
Attorney, Agent, or Firm—Joseph P. Gastel

[57] ABSTRACT

A multi-part locknut including a locknut body, a locknut head having an endless curvilinear key-receiving groove therein secured to the locknut body, and a locknut sleeve rotatably mounted on the locknut body and held in position between portions of the locknut head and locknut body.

11 Claims, 3 Drawing Figures

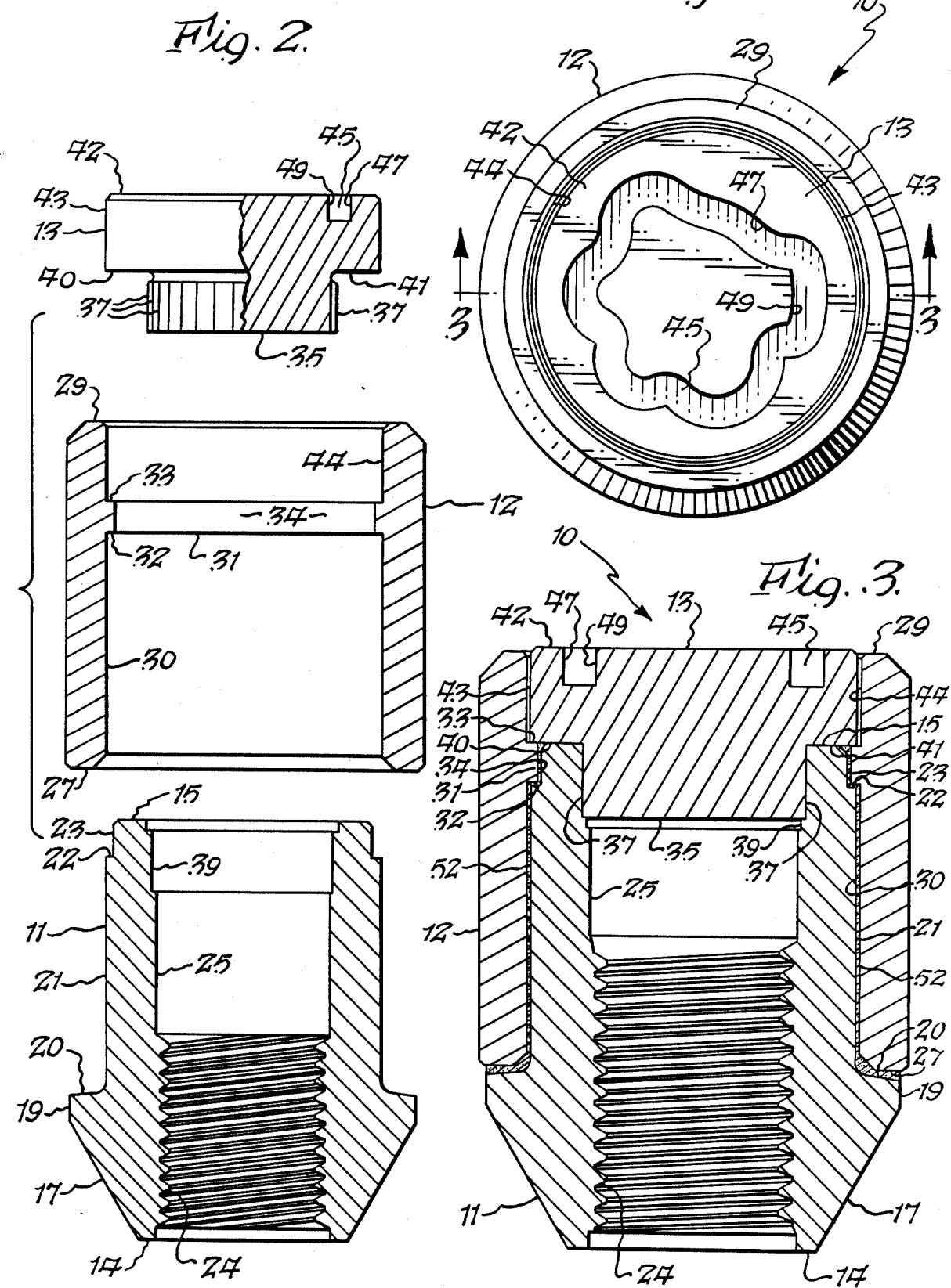

MULTI-PART LOCKNUT CONSTRUCTION

BACKGROUND OF THE INVENTION

The present invention relates to an improved locknut of the type which is used to secure a member to a related stud and which requires a special key to turn it into and out of locking engagement with the stud.

By way of background, locknuts of the type shown in U.S. Pat. No. 3,241,408 are known which require a special key for turning them. These locknuts are made from a single piece of suitably formed metal having a frustoconical outer surface which cannot be grabbed by conventional wrenches. The present invention relates to a variant form of locknut of this general type. In addition, since different sizes and shapes of locknuts were required for different applications, a relatively high inventory of different locknuts had to be maintained. It is with overcoming the foregoing deficiencies of the prior art that the present invention is concerned.

SUMMARY OF THE INVENTION

It is the primary object of the present invention is to provide an improved locknut which cannot be turned by a wrench which is applied to the outer surface thereof.

Another object of the present invention to provide an improved locknut which is assembled from a plurality of parts, many of which are standard so thereby reducing inventory.

A further object of the present invention is to provide an improved locknut which can be assembled from a plurality of parts in an extremely simple and expedient manner.

Yet another object of the present invention is to provide an improved locknut containing a plurality of assembled parts which will not rattle when subject to vibration. Other objects and attendant advantages of the present invention will readily be perceived hereafter.

The present invention relates to a a multi-part locknut comprising a locknut body, a locknut head, securing means securing said locknut head to said locknut body, and a locknut sleeve rotatably mounted on said locknut body.

The various aspects of the present invention will be more fully understood when the following portions of the specification are read in conjunction with the accompanying drawings wherein:

BRIEF DESCRIPTION OF THE DRAWINGS

FIG. 1 is a plan view of the improved locknut of the present invention;

FIG. 2 is a fragmentary exploded view partially in cross section taken substantially in the direction of line 3—3 of FIG. 1 and showing the various parts of the improved locknut; and FIG. 3 is a cross sectional view taken substantially along line 3—3 of FIG. 1 and showing the parts of the improved locknut in assembled relationship.

DESCRIPTION OF THE PREFERRED EMBODIMENTS

The improved locknut 10 of the present invention includes three parts, namely, a locknut body 11, a locknut sleeve 12, and a locknut head 13 with the locknut sleeve being rotatably mounted on the locknut body so that if a wrench is applied thereto, it will turn without turning the remainder of the locknut.

Locknut body 11 has first and second ends 14 and 15, respectively. A frustoconical outer portion 17 is located at the first end and it is this portion of the locknut which bears against an item, such as a wheel rim (not shown), for holding the latter in place. Frustoconical portion 17 merges into cylindrical portion 19 which in turn merges into shoulder 20. A perfectly cylindrical portion 21 on locknut body 11 terminates at shoulder 22, and a cylindrical portion 23 extends between shoulder 22 and end 15. An internally threaded or tapped portion 24 extends inwardly into locknut body 11 from end 14 and terminates at bore 25. Internally threaded portion 24 is for receiving a mating stud or bolt (not shown) in threaded relationship. Locknut body 11 is fabricated from ductile steel so that it has the desired properties for attachment to a bolt or stud.

Locknut sleeve 12 includes a first annular sleeve end 27 and a second annular sleeve end 29. It also includes an internal cylindrical surface 30 which lies in contiguous rotatable relationship to cylindrical surface 21 of locknut body 11. Sleeve end 27 is located in contiguous relationship to locknut body shoulder 20. In addition, sleeve 12 includes an internal annular cylindrical ridge 31 having opposite sides 32 and 33. Side 32 lies in contiguous relationship to shoulder 22 of locknut body 11, and the surface 34 of ridge 31 lies in contiguous relationship to locknut body portion 23. Sleeve 11 is chromeplated for appearance and corrosion resistance.

Locknut head 13 includes a cylindrical end 35 which has splined portion 37 throughout its circumferential extent and is of slightly larger diameter than bore 39 in locknut body 11. Locknut head 13 is assembled with locknut body 11 by pressing splined portion 37 into bore 39 so that there is a good holding interference fit. The outer annular edge portion 40 of locknut head 13 comprises a shoulder which lies in contiguous relationship to side 33 of ridge 31 of sleeve 12, to thereby retain sleeve 12 in assembled relationship with it and body 11. The undersurface 41 of locknut head 13 abuts end 15 of locknut body 11. Locknut head 13 is much harder than zinc-coated body 11 so that the splined end 35 thereon will cut into bore 39 and will be retained therein with a force which prevents its dislodgement. The zinc coating also permits sleeve 12 to turn without seizing, if turning is required.

The end 42 of locknut head 13 is substantially planar and it lies substantially flush with end 29 of sleeve 12. The side 43 of locknut head 13 is covered by portion 44 of sleeve 12 so that it cannot be grasped by a wrench. An endless curvilinear groove 45 having sides 47 and 49 is located in locknut head 13 for receiving a mating curvilinear ridge on a suitable key which is used to turn the locknut 10. Grooves and keys of this type are disclosed in U.S. Pat. Nos. 3,241,408 and 4,480,513 which are incorporated herein by reference. It will be appreciated that other key-receiving configurations may be associated with locknut head 13.

A silicone rubber compound 52 is located between the contiguous surfaces 23–34, 21–30, and 20–27 for both sealing the spaces between these surfaces against entry of moisture and for preventing rattling of sleeve 12 on locknut body 11. The sealant is applied to the outer surfaces 21 and 23 of body 11 before sleeve 12 is mounted thereon.

If an attempt should be made to turn locknut 10 by applying a wrench to sleeve 12, the latter will merely rotate without in any way imparting rotary motion to either locknut body 11 or locknut head 13. Locknut 10, in addition to operating in the foregoing manner, also possesses the following advantages, namely, different bodies, such as 11, having only different end configurations at 17 can be used with the same sleeve 12, thereby reducing inventory. In addition, the same locknut head can be used with different styles of locknut bodies 11. In other words, locknut sleeve 12 and locknut head 13, except for the configuration of groove 45, may be standard items which are assembled with different locknut bodies 11, thereby greatly reducing inventory.

While preferred embodiments of the present invention have been disclosed, it will be appreciated that the present invention is not limited thereto, but may be otherwise embodied within the scope of the following claims.

What is claimed is:

1. A locknut comprising a locknut body having first and second locknut body ends, an internal thread at said first locknut body end, a bore at said second locknut body end, an outer surface on said locknut body, a sleeve in effective engagement with and rotatably mounted on said outer surface, a separate locknut head having first and second locknut head ends, first securing means for permanently securing said first locknut head end in said bore against removal from said locknut body, second securing means on said locknut head for permanently securing said sleeve on said outer surface against removal therefrom under all operating conditions of said locknut, and key-receiving means on said second locknut head end for turning said locknut body.

2. A locknut as set forth in claim 1 wherein said key-receiving means comprises an endless curvilinear groove.

3. A locknut as set forth in claim 1 wherein said first securing means comprises a press-fit between said first locknut head end and said bore.

4. A locknut as set forth in claim 3 wherein said second securing means comprises a shoulder on said locknut head, and a ridge on an internal portion of said sleeve in contiguous relationship to said shoulder.

5. A locknut as set forth in claim 4 including a second shoulder on said locknut body at said second locknut body end on the opposite side of said ridge from shoulder and in contiguous relationship to said ridge.

6. A locknut as set forth in claim 5 wherein said sleeve includes first and second sleeve ends, a third shoulder on said locknut body between said first and second locknut body ends, said first sleeve end being in contiguous relationship to said third shoulder.

7. A locknut as set forth in claim 6 including a substantially planar face in said second locknut head end, said second sleeve end lying substantially flush with said substantially planar face.

8. A locknut as set forth in claim 1 including a sealing compound between said outer surface of said locknut body and said sleeve.

9. A multi-part locknut comprising a locknut body, a locknut head, securing means permanently securing said locknut head to said locknut body against removal therefrom, a locknut sleeve rotatably mounted on said locknut body, and retaining means for permanently retaining said locknut sleeve between portions of said locknut body and said locknut head against removal from said locknut body under all conditions of operation of said locknut, and key-receiving means on said locknut head for turning said locknut body.

10. A multi-part locknut as set forth in claim 9 wherein said retaining means comprises a first shoulder on said locknut head, and a second shoulder on said locknut body, a ridge on said locknut sleeve being located between said first and second shoulders.

11. A locknut comprising an elongated locknut body having a longitudinal axis and first and second locknut body ends, a first annular face at said first locknut body end extending transversely to said longitudinal axis, an object-engaging surface and an internal thread at said second end, a first cylindrical surface of a first diameter on said locknut body immediately adjacent said first annular face, a second cylindrical surface on said locknut body on the opposite side of said first cylindrical surface from said first annular face, said second cylindrical surface being of a second diameter which is larger than said first diameter, a first shoulder forming a junction between said first and second cylindrical surfaces, a second shoulder located at the opposite end of said second cylindrical surface from said first shoulder, said first shoulder extending inwardly toward said longitudinal axis from said second cylindrical surface, said second shoulder extending outwardly from said second cylindrical surface away from said longitudinal axis, a sleeve having first and second end portions, a second annular face on said first end portion of said sleeve in contiguous relationship to said second shoulder, a first internal cylindrical surface on said first end portion of said sleeve in contiguous mounted relationship on said second cylindrical surface and in effective rotational engagement therewith, an internal ridge in said sleeve between said first and second end portions of said sleeve, a third shoulder on said ridge in contiguous relationship to said first shoulder, a third cylindrical surface on said ridge in contiguous relationship to said first cylindrical surface, a fourth shoulder on said ridge on the opposite side of said third cylindrical surface from said third shoulder, a locknut head having a first cylindrical head end of a third diameter, a bore in said locknut body proximate said first annular face, said bore being of a fourth diameter which is slightly smaller than said third diameter to receive said first cylindrical head end with an interference fit, a second cylindrical head end on said locknut head of a fifth diameter which is larger than said fourth diameter, a fifth shoulder on said locknut head between said first and second cylindrical head ends, said fifth shoulder being in contiguous relationship to both said first annular face and said fourth shoulder to thereby retain said ridge in position between said fifth shoulder and said third shoulder, said second end portion of said sleeve being on the opposite side of said ridge from said first end portion of said sleeve, a second internal cylindrical surface on said second end portion of said sleeve, said second internal cylindrical surface being in contiguous relationship to said second cylindrical head end, a face on said locknut head extending substantially perpendicularly to said second cylindrical head end on the opposite side thereof from said first cylindrical head end, a third annular face on said second sleeve end at the opposite side of said second internal cylindrical surface from said ridge, said third annular face lying substantially flush with said face on said locknut head, and a curvilinear groove in said face on said locknut head for receiving a locknut key.

* * * * *